United States Patent
Amma et al.

(10) Patent No.: US 10,525,711 B2
(45) Date of Patent: Jan. 7, 2020

(54) METHOD OF MANUFACTURING LIQUID EJECTING HEAD

(71) Applicant: CANON KABUSHIKI KAISHA, Tokyo (JP)

(72) Inventors: Hiromasa Amma, Kawasaki (JP); Yukuo Yamaguchi, Tokyo (JP); Toshiaki Hirosawa, Hiratsuka (JP); Soji Kondo, Yokohama (JP); Takuya Iwano, Inagi (JP); Noriyasu Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 15/807,865

(22) Filed: Nov. 9, 2017

(65) Prior Publication Data

US 2018/0141341 A1    May 24, 2018

(30) Foreign Application Priority Data

Nov. 24, 2016    (JP) .................................. 2016-228054

(51) Int. Cl.
   *B29C 45/16*    (2006.01)
   *B41J 2/16*    (2006.01)
   (Continued)

(52) U.S. Cl.
   CPC ......... *B41J 2/1637* (2013.01); *B29C 45/0062* (2013.01); *B29C 45/04* (2013.01);
   (Continued)

(58) Field of Classification Search
None
See application file for complete search history.

(56) References Cited

U.S. PATENT DOCUMENTS 6,365,083 B1 * 4/2002 Nishida ............... B29C 45/0062
   264/255
6,383,436 B1 * 5/2002 Nishimuro ............. B29C 45/14
   264/245
(Continued)

FOREIGN PATENT DOCUMENTS

JP    2007-245421 A    9/2007

OTHER PUBLICATIONS

Iijima et al., U.S. Appl. No. 15/631,120, filed Jun. 23, 2017.
(Continued)

*Primary Examiner* — Edmund H Lee
(74) *Attorney, Agent, or Firm* — Venable LLP

(57) ABSTRACT

A method of manufacturing a liquid ejecting head has a first molding step, a step of performing positioning and a second molding step. In the first molding step, a first member, a second member, and a third member are molded by injecting a resin at different locations inside of a set of a fixed mold, an intermediate movable mold, and a movable mold. In the step of performing positioning, the set is detached in a first direction and the intermediate movable mold and the movable mold are moved in a second direction. In the second molding step, a resin is injected to the inside of the set that is clamped to bond. During a period from the first molding step to completion of the second molding step, the first member, the second member, and the third member are held by insert mold pieces used for molding the members, respectively, in the first molding step.

11 Claims, 14 Drawing Sheets

(51) Int. Cl.
    *B29C 45/00* (2006.01)
    *B29C 45/04* (2006.01)
    *B29L 31/00* (2006.01)

(52) U.S. Cl.
    CPC ........ *B29C 45/162* (2013.01); *B29C 45/1615* (2013.01); *B41J 2/162* (2013.01); *B29C 2045/1617* (2013.01); *B29L 2031/767* (2013.01)

(56) References Cited

U.S. PATENT DOCUMENTS

| | | | | |
|---|---|---|---|---|
| 8,388,114 | B2* | 3/2013 | Yamaguchi | B41J 2/16532 347/66 |
| 9,764,554 | B2* | 9/2017 | Amma | B41J 2/1637 |
| 10,300,643 | B2* | 5/2019 | Tsujiuchi | B29C 45/1657 |
| 10,307,967 | B2* | 6/2019 | Toda | B29C 65/70 |
| 10,363,692 | B2* | 7/2019 | Oikawa | B29C 45/0062 |
| 2010/0171798 | A1* | 7/2010 | Yamaguchi | B41J 2/16532 347/85 |
| 2014/0071199 | A1* | 3/2014 | Tajima | B29C 45/1671 347/29 |
| 2015/0328810 | A1* | 11/2015 | Kawamura | B29C 45/16 428/35.7 |
| 2016/0346967 | A1 | 12/2016 | Oikawa et al. | |
| 2016/0346968 | A1 | 12/2016 | Kimura et al. | |
| 2016/0346969 | A1 | 12/2016 | Toda et al. | |
| 2016/0346970 | A1 | 12/2016 | Oikawa et al. | |
| 2016/0346971 | A1 | 12/2016 | Iwano et al. | |
| 2016/0346976 | A1 | 12/2016 | Tsujiuchi et al. | |
| 2016/0347072 | A1 | 12/2016 | Iwano et al. | |
| 2018/0001527 | A1* | 1/2018 | Iijima | B29C 45/06 |
| 2018/0141340 | A1* | 5/2018 | Kondo | B41J 2/14088 |

OTHER PUBLICATIONS

Oikawa et al., U.S. Appl. No. 15/628,934, filed Jun. 21, 2017.
Toda et al., U.S. Appl. No. 15/628,947, filed Jun. 21, 2017.
Tsujiuchi et al., U.S. Appl. No. 15/649,482, filed Jul. 13, 2017.
Tsujiuchi et al., U.S. Appl. No. 15/649,472, filed Jul. 13, 2017.
Iwano et al., U.S. Appl. No. 15/799,083, filed Oct. 31, 2017.
Nagai et al., U.S. Appl. No. 15/794,232, filed Oct. 26, 2017.
Kondo et al., U.S. Appl. No. 15/806,700, filed Nov. 8, 2017.

* cited by examiner

METHOD OF MANUFACTURING LIQUID EJECTING HEAD

BACKGROUND OF THE INVENTION

Field of the Invention

The present invention relates to a method of manufacturing a liquid ejecting head used in an inkjet printing apparatus and the like.

Description of the Related Art

Japanese Patent Laid-Open No. 2007-245421 discloses an elongated inkjet printing head to be mounted on a full-line type inkjet printing apparatus. An elongated inkjet printing head as the one in Japanese Patent Laid-Open No. 2007-245421 utilizes an ejection assembly in which relatively short-length print chips each including an array of nozzles configured to eject an ink are also arranged in a direction of the arrays of nozzles. Then, the inkjet printing head is finished by attaching and bonding a passage member for supplying the ink concurrently to all the print chips to the ejection assembly.

Such a passage member for supplying the liquid smoothly to the elongated ejection assembly utilizes resin forming in view of costs, the degree of freedom of shape, and so forth. Japanese Patent Laid-Open No. 2007-245421 also discloses the resin-formed passage member. Specifically, the passage member is manufactured by molding elongated passage forming layers each having a flat plate shape and then stacking these layers on one another. Thus, complicated passage structures that correspond to multiple ink colors, respectively, are realized inside the passage member. Then, the inkjet printing head is finished by attaching the passage member thus formed and an ejecting module to each other by use of an adhesive.

However, in the manufacturing process of stacking the elongated passage forming layers of the flat plate shape on one another, each passage forming layer inevitably causes a certain level of undulation or warpage due to demolding or shrinkage during the process. Hence, there is a risk that the layers may be further deformed when stacked and bonded to one another. Moreover, attachment of the ejection assembly to the deformed passage member is likely to cause variations in attached orientations among the print chips, whereby adhesion between the ejection assembly and the passage member may also be damaged. Meanwhile, when the inkjet printing head is mounted on the printing apparatus, the ejection assembly may have variations in facing distance and facing angle with respect to a printing medium, and such variations may affect images printed on the printing medium.

SUMMARY OF THE INVENTION

The present invention has been made to solve the aforementioned problems. Accordingly, an object of the invention is to manufacture a liquid ejecting head, which is capable of printing a stable image on a printing medium while securing adhesion between an ejection assembly and a passage member, by resin molding the passage member in a flat plate shape without undulation or warpage.

According to an aspect of the present invention, there is provided a method of manufacturing a liquid ejecting head having a liquid ejecting module provided with arrayed elements to eject a liquid, and a passage member to supply the liquid to the liquid ejecting module, the method comprising: a first molding step of molding a first member, a second member, and a third member, which collectively form the passage member, at different locations inside of a set of a fixed mold, an intermediate movable mold, and a movable mold being made detachable from one another in a first direction, the set being clamped together in the first direction, by injecting a resin to the different locations inside; a step of performing positioning among the first member, the second member, and the third member in a second direction different from the first direction after the first molding step, by moving the intermediate movable mold and the movable mold in the first direction to detach the fixed mold, the intermediate movable mold, and the movable mold from one another, and moving the intermediate movable mold and the movable mold in the second direction; and a second molding step after the step of performing the positioning, by injecting a resin to the inside of the set of the fixed mold, the intermediate movable mold, and the movable mold being clamped together in the first direction so as to bond the first member, the second member, and the third member to one another, wherein during a period from the first molding step to completion of the second molding step, the first member, the second member, and the third member are held by insert mold pieces used for molding the members, respectively, in the first molding step.

Further features of the present invention will become apparent from the following description of exemplary embodiments with reference to the attached drawings.

DESCRIPTION OF THE EMBODIMENTS (Description of Inkjet Printing Apparatus)

Figure 1:
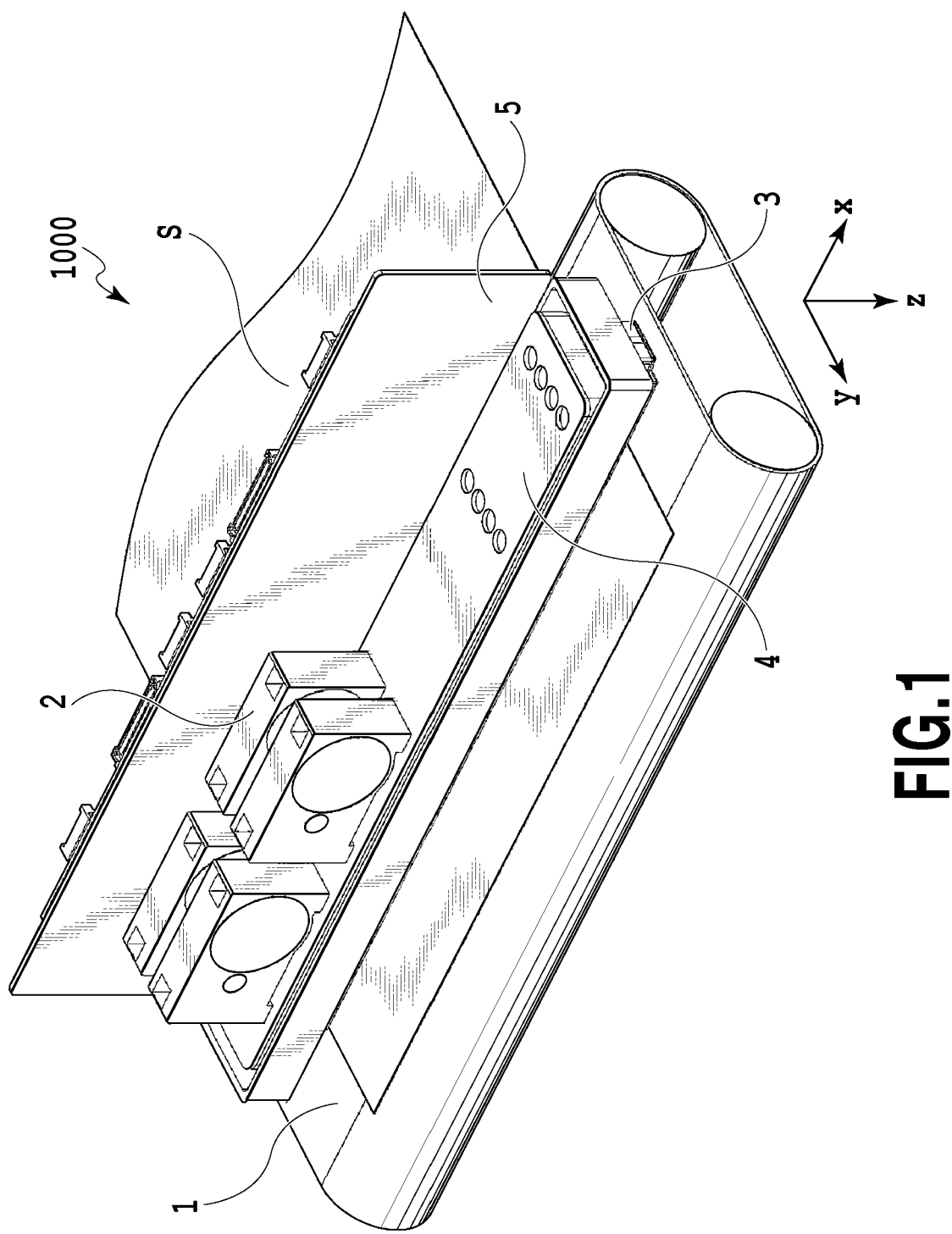
FIG. 1 is a schematic diagram of an internal configuration of an inkjet printing apparatus.

FIG. 1 is a schematic diagram of an internal configuration of an inkjet printing apparatus 1000 usable as a liquid ejecting apparatus of the present invention. A conveyance unit 1 conveys a sheet S serving as a printing medium in y direction at a constant velocity. A liquid ejecting head 3 ejects an ink in z direction onto the conveyed sheet S in accordance with printing data. The liquid ejecting head 3 of this embodiment is a full-line type inkjet printing head configured such that multiple nozzles to eject the ink of the same color (the liquid of the same type) are arranged in x direction for a distance corresponding to a width of the sheet S. Moreover, such nozzle arrays containing inks of cyan, magenta, yellow, and black, respectively, are arranged in parallel in the y direction. Data and electric power necessary for ejecting actions are supplied from an electric wiring unit 5. Note that the sheet S may be a cut sheet or a rolled sheet.

A liquid supply unit 4 for receiving the inks from a not-illustrated tube and to supply the inks to the liquid ejecting head 3 is installed above the liquid ejecting head 3 in the direction of gravity (−z direction). Moreover, negative pressure regulating units 2 for regulating pressures of the inks to be supplied to the liquid ejecting head 3 are installed above the liquid supply unit 4. Each of the negative pressure regulating units 2 is prepared for each of the colors, so that the negative pressures in the liquid ejecting head 3 can be regulated independently depending on the ink colors. In all of the drawings inclusive of FIG. 1, the x, y, and z axes are direction axes fixed to the liquid ejecting head of this embodiment and are used for describing directions of respective components. Note that these axes are not fixed to the direction of gravity or the like at the time of using the printing apparatus or at the time of manufacturing the printing head.

(Explanation of Circulation Passage)

Figure 2:
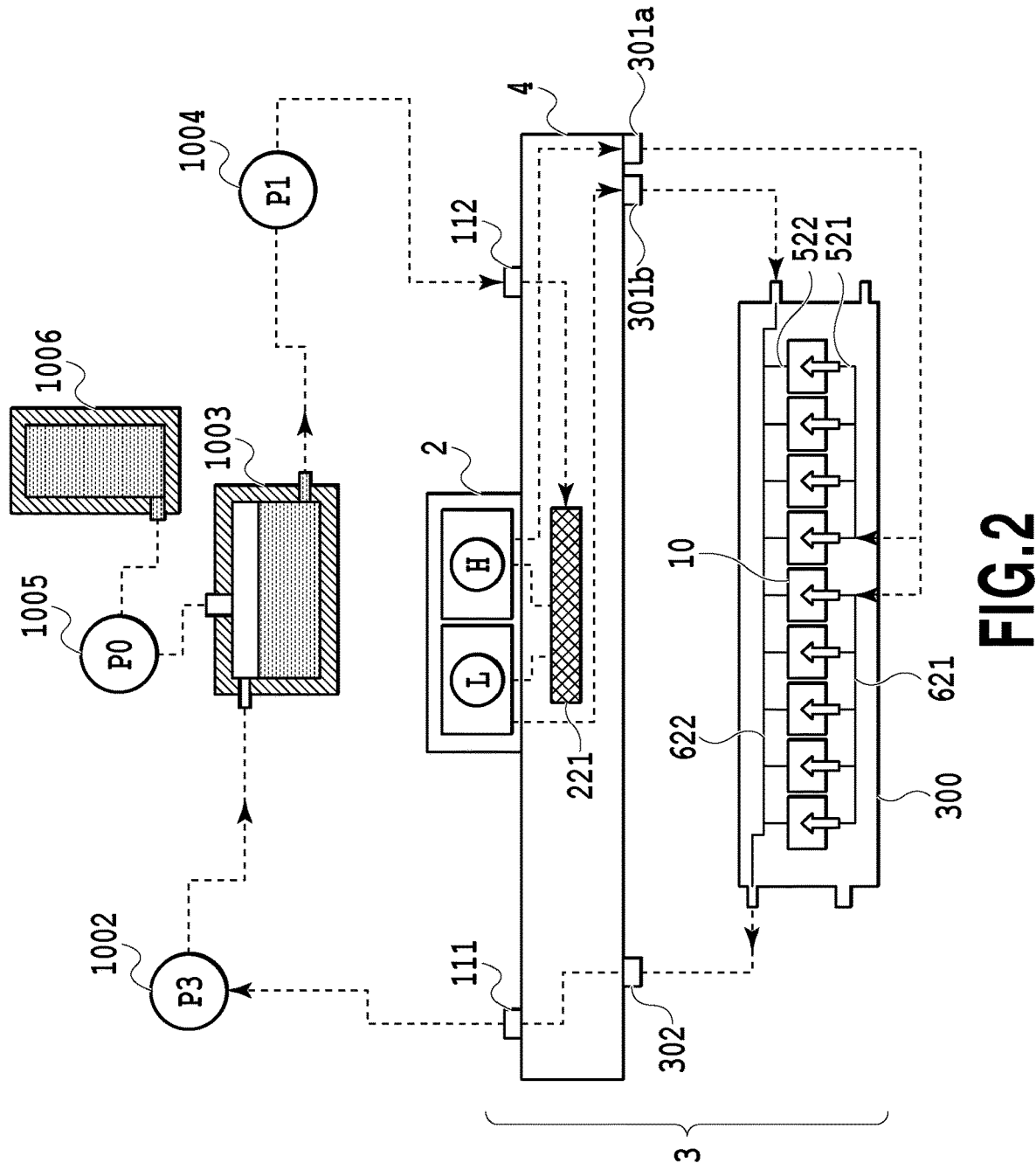
FIG. 2 is a diagram showing a liquid circulation passage in the inkjet printing apparatus.

FIG. 2 is a diagram showing a liquid circulation passage in the inkjet printing apparatus 1000. While a circulation passage for the ink of a certain color is illustrated herein, similar circulation passages for the respective ink colors of C, M, Y, and K are prepared in the actual printing apparatus. A buffer tank 1003 is connected to a first circulation pump 1002 and a second circulation pump 1004, and the ink is fed in a direction from the left to the right in FIG. 2 by operations of these pumps. Meanwhile, when the amount of the ink in the buffer tank 1003 gets low, a refilling pump 1005 is operated to supply the ink from a large-volume main tank 1006, which is fixed to the inside of the apparatus. The buffer tank 1003 is provided with an atmosphere communication port, so that bubbles flowing in the liquid circulation passage can be discharged therefrom.

The ink flowing out of the liquid supply unit 4 through an outflow connector 111 is guided to the buffer tank 1003 by the first circulation pump 1002. The second circulation pump 1004 supplies the ink reserved in the buffer tank 1003 to the liquid supply unit 4 through an inflow connector 112. Installation of the second circulation pump 1004 makes it possible to maintain a flow pressure inside the liquid ejecting head 3 within a predetermined range in case of a sudden decrease of the ink in the buffer tank 1003 attributed to high-density printing or recovery processing for the liquid ejecting head 3.

The liquid supply unit 4 removes foreign matters from the ink taken in through the inflow connector 112 by using a filter 221, and then supplies the ink to the negative pressure regulating unit 2. A negative pressure regulating subunit H configured to release the ink at a high pressure and a negative pressure regulating subunit L configured to release the ink at a low pressure are arranged in parallel in the negative pressure regulating unit 2. Then, the ink released from the negative pressure regulating subunit H is supplied to a liquid ejecting unit 300 in the liquid ejecting head 3 through an inflow port 301a, while the ink released from the negative pressure regulating subunit L is supplied thereto through an inflow port 301b, respectively. Installation of the above-described negative pressure regulating unit 2 makes it possible to maintain a flow pressure in the liquid ejecting unit 300, which is located downstream of the negative pressure regulating unit 2, within a certain range even if a flow rate in the circulation system fluctuates due to a change in printing duty.

The liquid ejecting unit 300 is provided with a common supply passage 621 in which the ink flows at the high pressure owing to the negative pressure regulating subunit H, and a common collection passage 622 in which the ink flows at the low pressure owing to the negative pressure regulating subunit L. Moreover, in the liquid ejecting unit 300, a plurality of printing element substrates 10 each formed by arranging multiple nozzles in the x direction are further connected to each other in the x direction. In addition, each printing element substrate 10 is provided with an individual supply passage 521 to be connected to the common supply passage 621, and an individual collection passage 522 to be connected to the common collection passage 622. Accordingly, a flow of the ink is created in each printing element substrate 10 due to a difference in flow pressure between the common supply passage 621 and the common collection passage 622. Specifically, the ink flows from the common supply passage 621 having the high pressure through the individual supply passage 521, and the ink flows out to the common collection passage 622 through the individual collection passage 522.

When each printing element substrate 10 performs an ejecting operation, part of the circulating ink is consumed by ejection and the remaining ink is passed through the individual collection passage 522 and the common collection passage 622, and is discharged from an outflow port 302 to the liquid supply unit 4. The ink flowing out of the outflow port 302 to the liquid supply unit 4 is sent toward the first circulation pump 1002 through the outflow connector 111.

In the liquid ejecting head using the above-described circulation supply circuit, heat generated by the ejecting operations of the printing element substrates 10 is absorbed by the flowing liquid. Thus, it is possible to suppress ejection failures attributed to heat storage even when the ejecting operations are continuously performed. In addition, a thickened ink or a foreign matter is less likely to remain in the vicinity of a nozzle with a low ejecting frequency. Thus, it is possible to stabilize the state of ejection of every nozzle.

However, if a flow velocity is set too high in order to obtain the aforementioned effect, a pressure loss in the liquid ejecting unit 300 is likely to cause differences in pressure among the printing element substrates 10, which may result in variations in the state of ejection to invite density unevenness and the like. Accordingly, a flow rate of discharge from the first circulation pump 1002 is preferably regulated to the extent such that neither differences in temperature nor differences in pressure among the plurality of printing element substrates 10 affects a printed image. Specific examples of the first circulation pump 1002 include positive displacement pumps having a quantitative liquid pumping capacity such as a tube pump, a gear pump, a diaphragm pump, and a syringe pump. Alternatively, it is also possible to secure a constant flow rate by disposing a general constant flow rate value or a general relief valve at an outlet of the pump.

On the other hand, the second circulation pump 1004 only needs to have a lifting pressure that is equal to or above a certain pressure in a range of an ink circulation flow rate used during the drive, so that a turbo pump or a positive displacement pump may be used. Specific examples thereof include a diaphragm pump and the like. Alternatively, the second circulation pump may be replaced by a water head tank disposed in such a way as to establish a certain water head difference from a negative pressure regulating unit, for example.

The two subunits H and L provided in the negative pressure regulating unit 2 may adopt a mechanism similar to a so-called "pressure reducing regulator". When the pressure reducing regulators are used, it is preferable to apply a pressure to the upstream side of the negative pressure regulating unit 2 through the liquid supply unit 4 by using the second circulation pump 1004 as shown in FIG. 2. In this way, it is possible to suppress an effect of the water head pressure from the buffer tank 1003 to the liquid ejecting head 3, and thus to increase the freedom of layout of the buffer tank 1003 in the printing apparatus 1000.

(Explanation of Configuration of Liquid Ejecting Head)

Figure 3A:
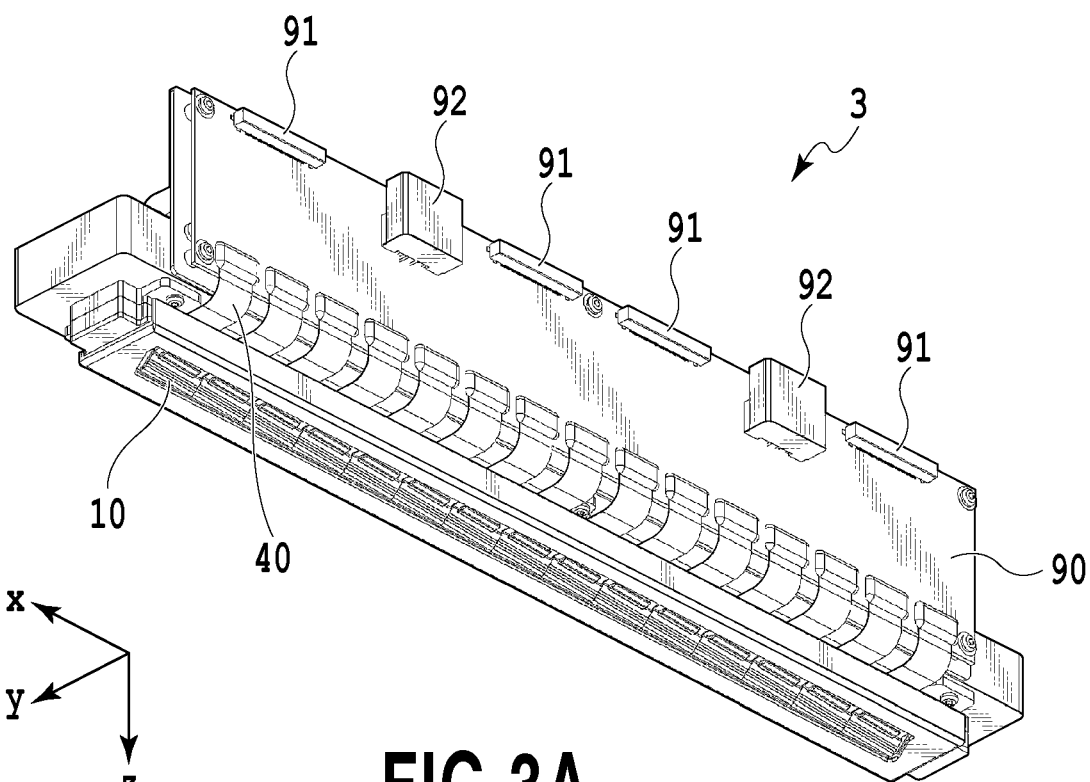
FIGS. 3A and 3B are external perspective views of a liquid ejecting head.
Figure 3B:
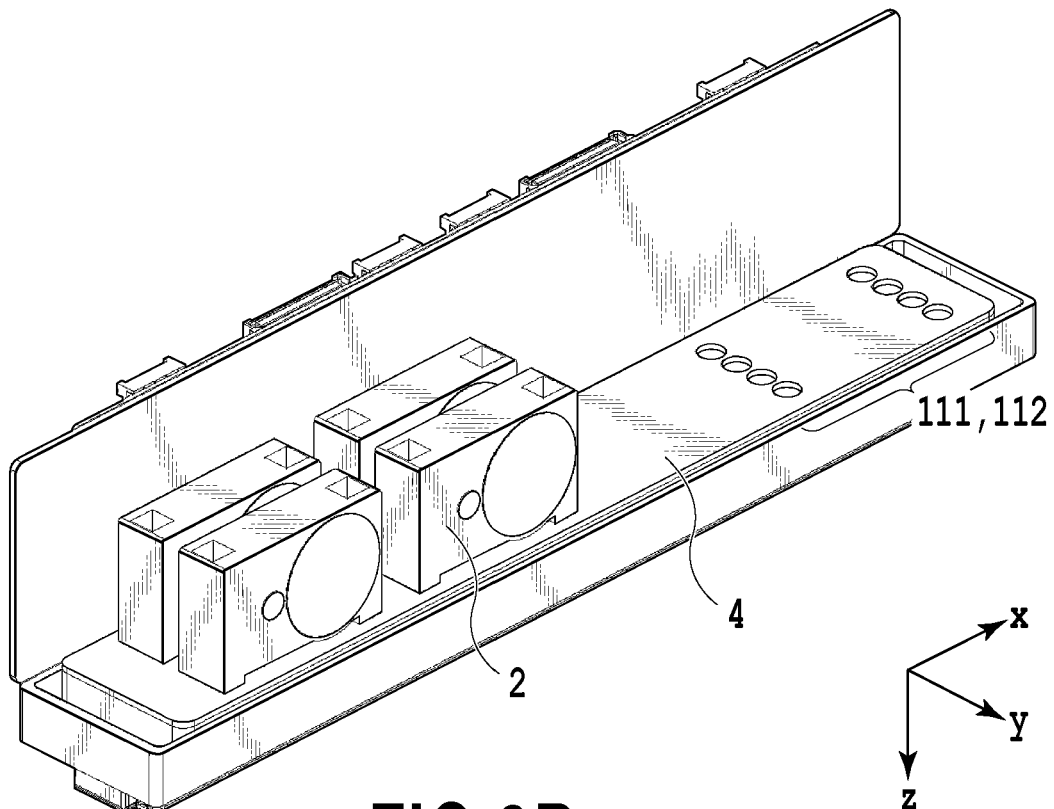

FIGS. 3A and 3B are external perspective views of the liquid ejecting head 3. The liquid ejecting head 3 of this embodiment is a full-line type color inkjet printing head covering the entire width of the sheet S. Fifteen printing element substrates 10 are arranged in the x direction and the respective printing element substrates 10 eject the inks of four colors, namely, cyan, magenta, yellow, and black in the z direction in accordance with ejection data.

The ejection data and the electric power for ejecting actions are inputted to signal input terminals 91 and power supply terminals 92 provided to an electric wiring substrate 90, and are supplied to the respective printing element substrates 10 through flexible wiring substrates 40. In this embodiment, the wiring is consolidated into electric circuits in the electric wiring substrate 90. Thus, the numbers of the signal input terminals 91 and the power supply terminals 92 are made fewer than the number (fifteen) of the printing element substrates 10. In other words, it is possible to reduce the number of times of attachment and detachment of electric connectors in association with assembly and replacement of the liquid ejecting head 3 with respect to the printing apparatus 1000.

Meanwhile, as described with reference to FIG. 2, the ink to be ejected from each printing element substrate 10 is fed into the liquid supply unit 4 through the inflow connector 112, then subjected to regulation of its flow pressure by the negative pressure regulating unit 2, and supplied to the liquid ejecting unit 300. Then, the ink not consumed by the ejection is discharged from the liquid ejecting head 3 again through the outflow connector 111. FIG. 3B shows the inflow connectors 112 corresponding to the inks of four colors and the outflow connectors 111 used for discharge of the inks. Tubes to communicate with various pumps are connected to the inflow connectors 112 and the outflow connectors 111, respectively.

Figure 4:
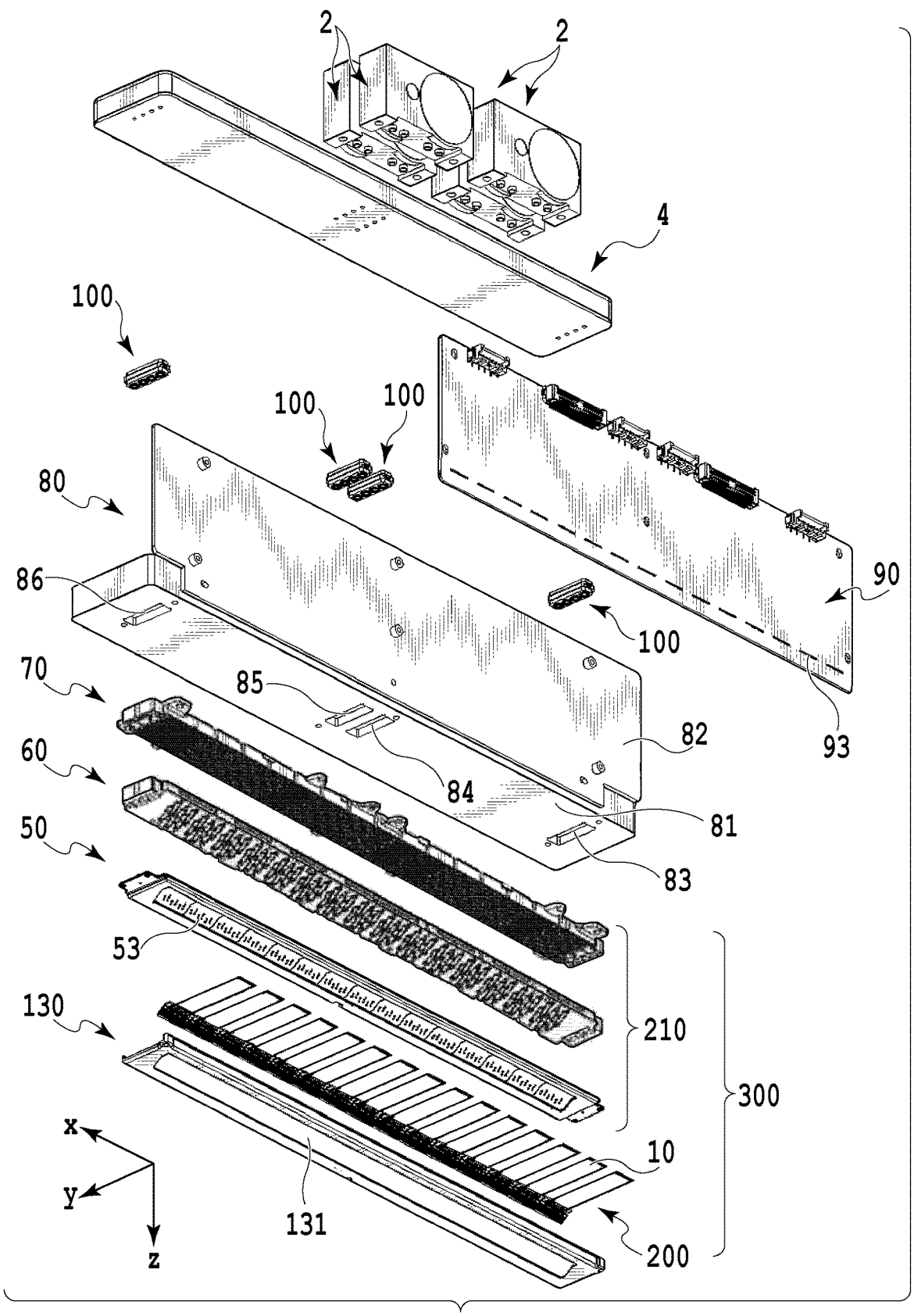
FIG. 4 is an exploded perspective view of the liquid ejecting head.

FIG. 4 is an exploded perspective view of the liquid ejecting head 3. The liquid ejecting head 3 is formed by attaching the liquid ejecting unit 300 from the +z direction side to a housing 80 provided in order to secure head rigidity, and attaching the liquid supply unit 4 and the negative pressure regulating unit 2 from the −z direction side to the housing 80 in this order. The electric wiring substrate 90 is fixed with screws to the −y direction side of the housing 80 together with an electric wiring substrate support 82. The liquid ejecting unit 300 is attached to the +z direction side of the housing 80 through a liquid ejecting unit support 81. Here, a passage member 210 that includes three layers of flat plate-shaped members, an ejecting module 200 that includes the fifteen printing element substrates 10, and a cover member 130 that covers the outer periphery of the aforementioned components are stacked in the z direction, thereby forming the liquid ejecting unit 300.

The negative pressure regulating units 2 are provided independently for the respective inks of four colors. The negative pressure regulating subunit H and the negative pressure regulating subunit L described with reference to FIG. 2 are arranged in parallel in each negative pressure regulating unit 2. Each of the negative pressure regulating subunit H and the negative pressure regulating subunit L regulates the flow pressure to a preset range by using a pressure regulation valve formed of a value, a spring member, and the like provided inside. Due to the function of the pressure regulation valve, even if a change in pressure loss associated with fluctuation of the flow rate of the liquid occurs in a supply system (a supply system on the upstream side of the liquid ejecting head 3), the pressure on the liquid ejecting unit 300 side located downstream of the pressure regulating unit is stabilized within a predetermined range.

The negative pressure regulating units 2 for the four colors are connected in common to the liquid supply unit 4 that extends in the x direction by a distance corresponding to a width of arrangement of the liquid ejecting unit 300. Accordingly, the liquid supply unit 4 is provided with the outflow connectors 111, the inflow connectors 112, and the filters 221 shown in FIG. 2 for the four colors, respectively. The configuration of the liquid ejecting unit 300 and a manufacturing method thereof will be described later in detail.

The housing 80 plays a role in correcting a warpage of the liquid ejecting unit 300 with a high degree of accuracy, and thus securing positional accuracy of the printing element substrates 10. For this reason, the housing 80 preferably has sufficient rigidity. Suitable materials therefor include metallic materials such as SUS and aluminum, ceramics such as alumina, and resins with added fillers and the like. Openings 83 to 86 to allow insertion of rubber joints 100 are provided at a bottom of the housing 80. The liquid flows in and out between the liquid supply unit 4 and the liquid ejecting unit 300 through the rubber joints 100.

The ejecting module 200 formed of the fifteen printing element substrates 10 has a configuration to eject the inks in the form of droplets, while the passage member 210 is configured to guide the liquid supplied from the liquid supply unit 4 to the individual printing element substrates 10 and further to the individual nozzles therein. The passage member 210 and the ejecting module 200 will be described later in detail.

The cover member 130 has an elongated opening 131 to expose ejecting port surfaces of the printing element substrates 10. A frame around the opening 131 comes into contact with a rubber cap member at the time of protecting the ejecting port surface of the liquid ejecting head 3 and performing suction recovery processing. When manufacturing the liquid ejecting head 3, an adhesive, a sealing material, and a filler are coated on an inner side of the frame and the coated surface are caused to adhere to the ejecting module 200. Thus, it is possible to enhance the degree of adhesion to the cap member and to improve the effects of the protection of the ejecting port surfaces and the recovery processing.

Figure 5A:
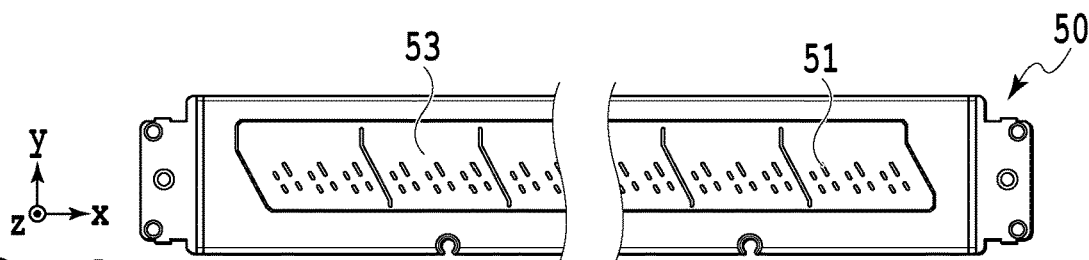
FIGS. 5A to 5F are diagrams for explaining a detailed configuration of a passage member.
Figure 5B:
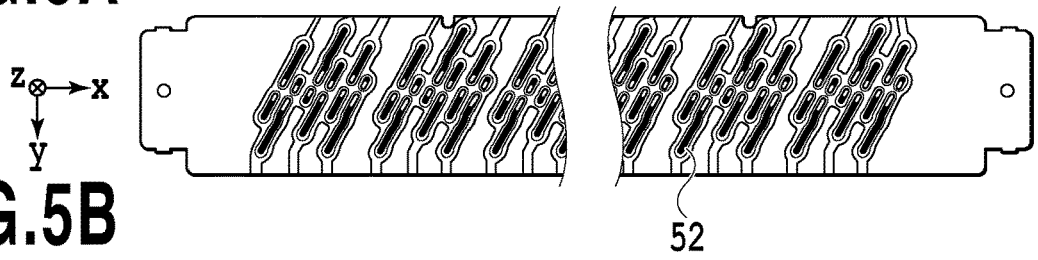
Figure 5C:
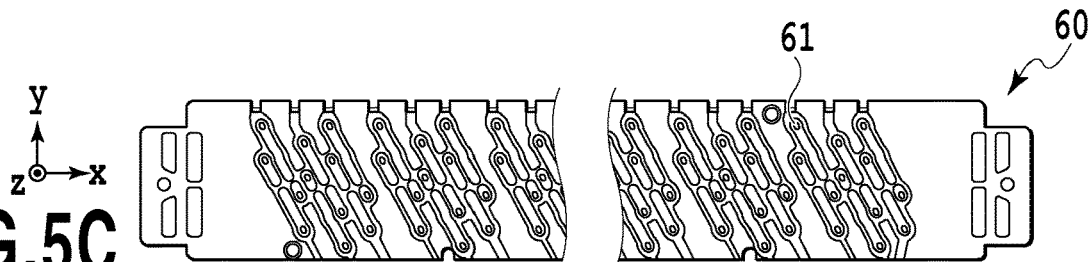
Figure 5D:
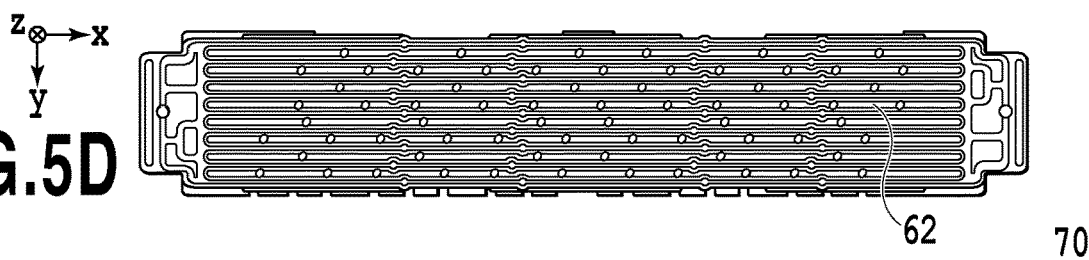
Figure 5E:
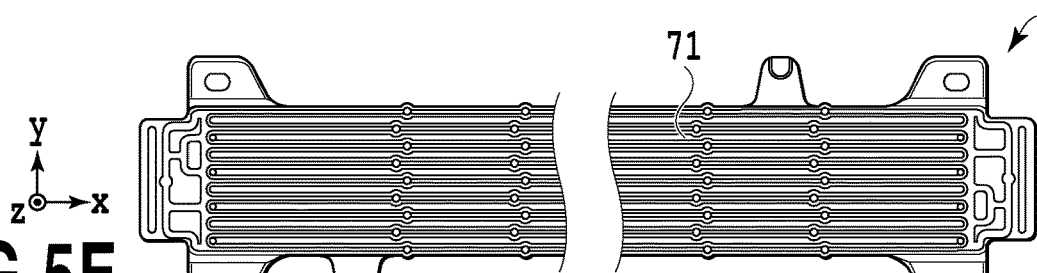
Figure 5F:
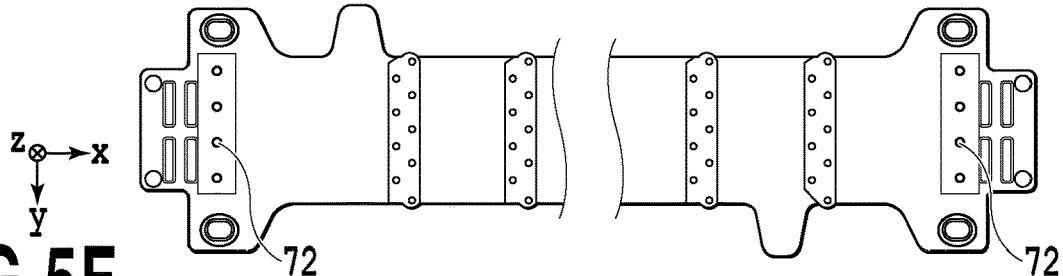

FIGS. 5A to 5F are diagrams for explaining a detailed configuration of the passage member 210. FIGS. 5A and 5B illustrate front and back surfaces of a first passage submember 50, FIGS. 5C and 5D illustrate front and back surfaces of a second passage submember 60, and FIGS. 5E and 5F illustrate front and back surfaces of a third passage submember 70, respectively. Each member has a flat plate shape of substantially the same form. FIG. 5A represents a surface to come into contact with the ejecting module 200, and FIG. 5F represents a surface to come into contact with the liquid supply unit 4. In the meantime, the surface of the first passage submember 50 shown in FIG. 5B comes into contact with the surface of the second passage submember 60 shown in FIG. 5C, and the surface of the second passage submember 60 shown in FIG. 5D comes into contact with the surface of the third passage submember 70 shown in FIG. 5E.

These passage submembers realize a passage configuration for guiding the inks supplied from the liquid supply unit 4 to the respective printing element substrates 10 of the ejecting module 200, and a passage configuration for taking the inks not consumed by the respective printing element substrates 10 back to the liquid supply unit 4. The above-described passage member 210 is fixed with screws to the liquid ejecting unit support 81 located at the bottom of the housing 80, and is thus prevented from warpage and deformation.

Multiple communication ports 72 are formed in the surface (FIG. 5F) of the third passage submember 70 coming into contact with the liquid supply unit 4 at positions corresponding to the inflow ports 301a and 301b and the outflow ports 302 of the liquid supply unit 4 described with reference to FIG. 2. The communication ports 72 penetrate to the back surface side (FIG. 5E), and common passage grooves 71 that extend in the x direction are formed on the back surface side. In FIG. 5E, four grooves out of the eight common passage grooves 71 are the common passage grooves 71 connected to the inflow ports 301a for the respective ink colors while the remaining four grooves are the common passage grooves 71 connected to the inflow ports 301b and the outflow ports 302 for the respective ink colors. Based on the above-described configuration, the inks supplied from the communication ports 72 as the inflow ports spread in the x direction along the common passage grooves 71 on the back surface.

Common passage grooves 62 that extend in the x direction are formed in the surface (FIG. 5D) of the second passage submember 60 coming into contact with the surface of the third passage submember 70 shown in FIG. 5E at positions corresponding to the common passage grooves 71 formed in the third passage submember 70. Moreover, communication ports 61 that penetrate to the back surface side (FIG. 5C) are formed at several positions along the x direction of each common passage groove 62. Based on the above-described configuration, part of the inks spreading in the common passage grooves 71 and 62 move to the back surface side (FIG. 5C) of the second passage submember 60.

Individual passage grooves 52 for guiding the inks from the communication ports 61 formed in the second passage submember 60 to positions where the nozzle arrays corresponding to the respective ink colors are provided are formed in the surface (FIG. 5B) of the first passage submember 50 coming into contact with the surface of the second passage submember 60 shown in FIG. 5C. Communication ports 51 that penetrate to the back surface side (FIG. 5A) are formed at end portions of the respective individual passage grooves 52 opposite from the communication ports 61. Based on the above-described configuration, the inks flowing in from the communication ports 61 travel along the individual passage grooves 52 and move to the surface (FIG. 5A) of the first passage submember 50 through the communication ports 51, which comes into contact with the ejecting module 200, thereby supplying the inks to the ejecting module 200. On the other hand, the inks not consumed by the ejecting module 200 return to the communication ports 72 of FIG. 5F via passages that are reverse of the aforementioned passages, and flow out of to the liquid supply unit 4.

Each of the first passage submember 50, the second passage submember 60, and the third passage submember 70 is preferably made of a material having sufficient corrosion resistance against the liquids (the inks) and having a low linear expansion coefficient. A resin material is a suitably usable material especially in order to define the complicated circulation passages as described above. In particular, a liquid crystal polymer (LCP) or polyphenyl sulfide (PPS) is favorable. Another example of the suitable material is a composite material formed by adding an inorganic filler such as fine particles of silica or fibers to polysulfone (PSF) or modified polyphenylene ether (PPE) serving as a matrix.

Figure 6:
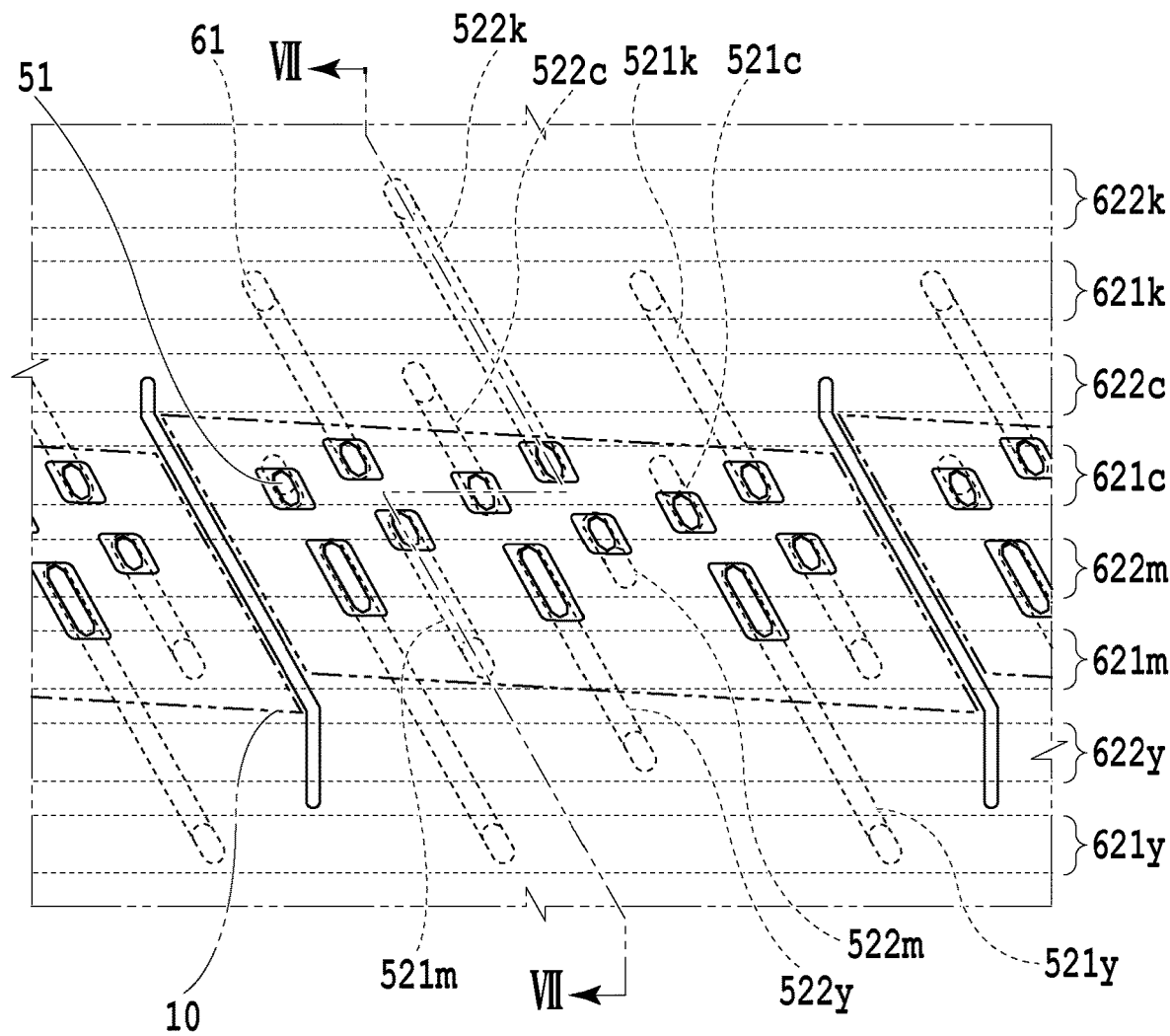
FIG. 6 is a transparent perspective view of the liquid ejecting head.

FIG. 6 is a transparent perspective view of the first passage submember 50, the second passage submember 60, and the third passage submember 70 when the passage member 210 is observed from the −z direction (a direction vertical to the respective surfaces). Here, the passage grooves used for the ink supply out of the eight common passage grooves 62 (71) shown in FIGS. 5D and 5E are denoted by 621$k$, 621$c$, 621$m$, and 621$y$ corresponding to the respective inks. Meanwhile, the passage grooves used for the ink collection are denoted by 622$k$, 622$c$, 622$m$, and 622$y$ corresponding to the respective inks. In addition, the passage grooves used for the ink supply out of the individual passage grooves 52 shown in FIG. 5B are denoted by 521$k$, 521$c$, 521$m$, and 521$y$ while those used for the ink collection are denoted by 522$k$, 522$c$, 522$m$, and 522$y$. As described above, regarding the communication ports 72, the common passage grooves 71 and 62, the communication ports 61, the individual passage grooves 52, and the communication ports 51, an inflow passage and an outflow passage are prepared independently for each of the multiple ink colors.

Figure 7:
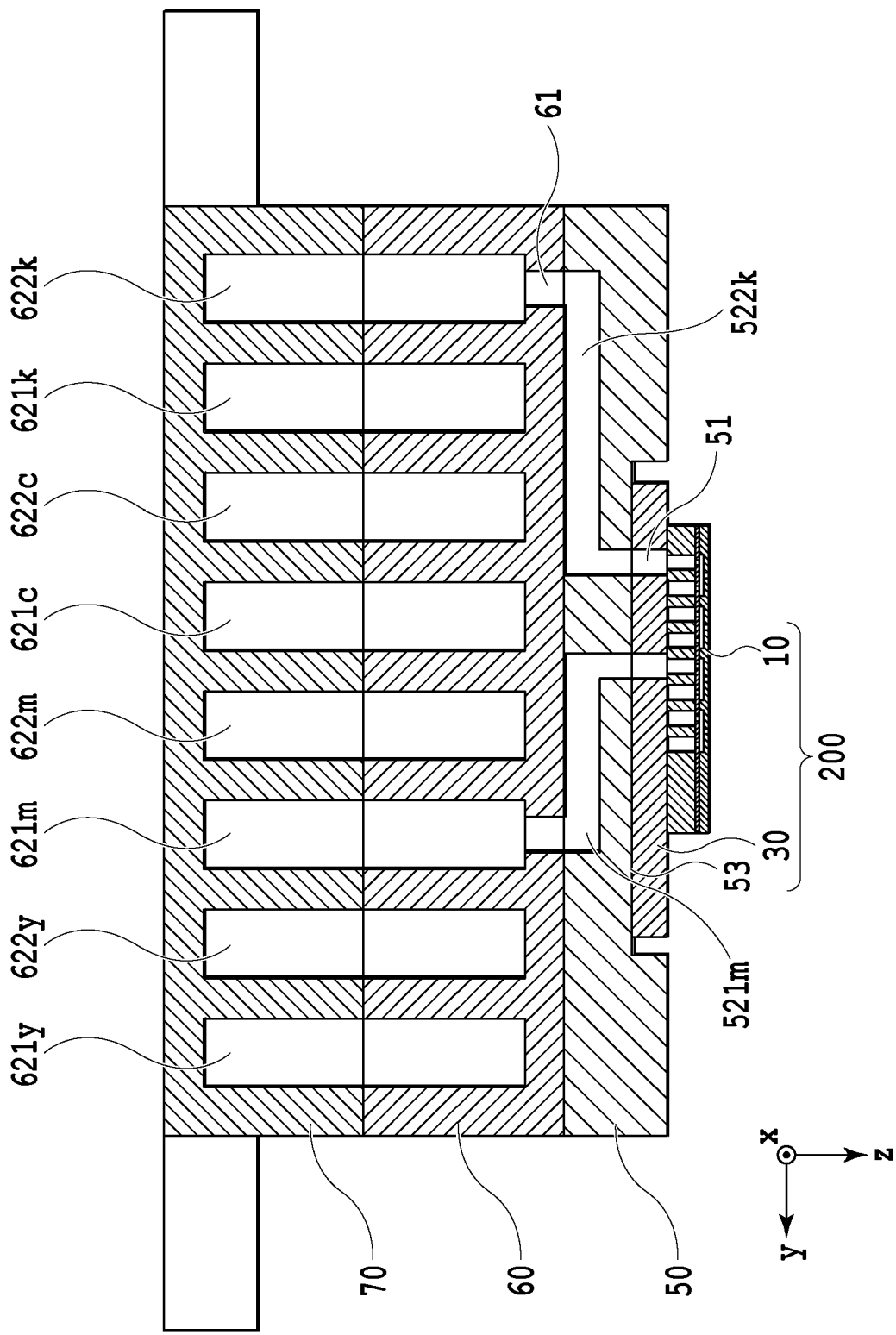
FIG. 7 is a cross-sectional view of the liquid ejecting head.

FIG. 7 is a cross-sectional view taken along the VII-VII line in FIG. 6. The common supply passages 621$k$, 621$c$, 621$m$, and 621$y$ for the ink supply as well as the common collection passages 622$k$, 622$c$, 622$m$, and 622$y$ for the ink collection are formed by overlaying the third passage submember 70 and the second passage submember 60. The common collection passage 622$k$ for collecting the black ink (K) and the common supply passage 621$m$ for supplying the magenta ink (M) are connected to the individual collection passage 522$k$ for the ink collection and the individual supply passage 521$m$ formed in the first passage submember 50, respectively. FIG. 7 also illustrates cross sections of the common supply passages 621 and the common collection passages 622 in the printing element substrate 10 described with reference to FIG. 2. The individual collection passage 522$k$ for the black ink (K) is connected to the common collection passage 622$k$ for the black ink (K), while the individual supply passage 521$m$ for the magenta ink (M) is connected to the common supply passage 621$m$ for the magenta ink (M).

According to the configuration described above, in the liquid ejecting unit 300 of this embodiment, each ink flows in the order of the common supply passage 621, the individual supply passage 521, the printing element substrate 10, the individual collection passage 522, and the common collection passage 622. Thus, it is possible to maintain the ink circulation described with reference to FIG. 2 smoothly. Note that the order of arrangement of the passage grooves for the black, cyan, magenta, and yellow in the y direction shown in FIGS. 6 and 7 is just one example, and other orders of arrangement are also applicable.

Figure 8A:
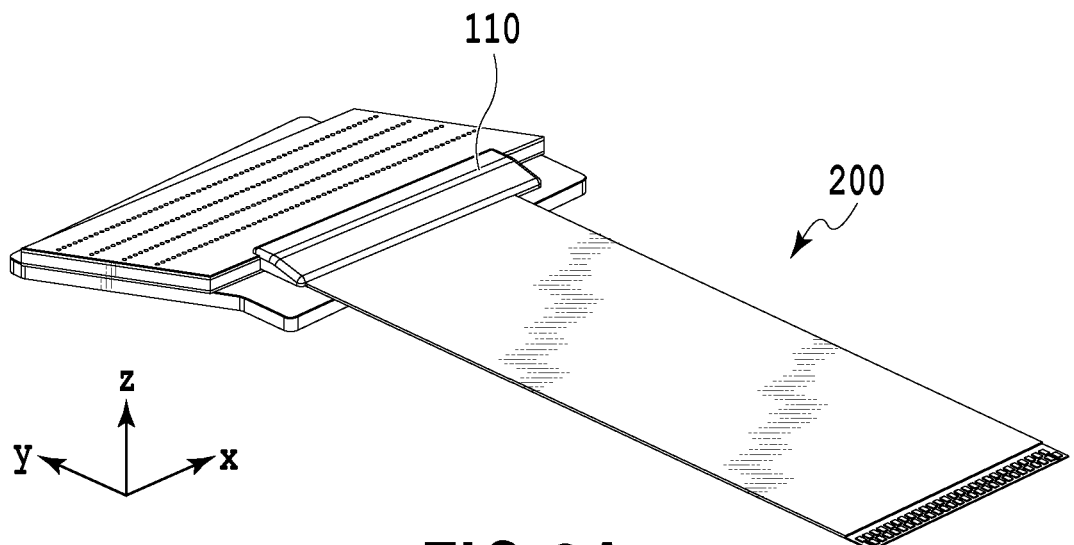
FIGS. 8A and 8B are a perspective view and an exploded diagram of an ejecting module.
Figure 8B:
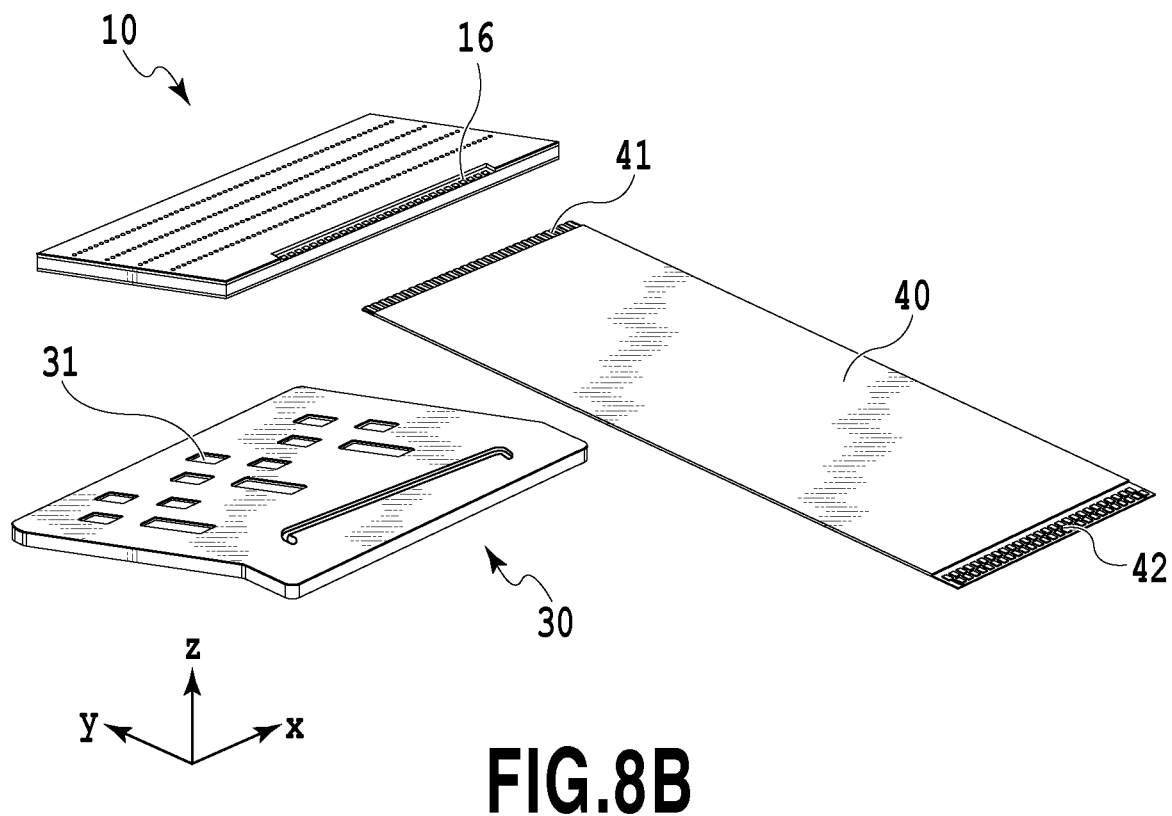

FIGS. 8A and 8B are a perspective view and an exploded diagram of the ejecting module 200. In the ejecting module 200, each printing element substrate 10 is attached onto a support member 30. Further, a terminal 16 on the printing element substrate 10 is electrically connected to a terminal 41 of the flexible wiring substrate 40 by wire bonding, and the wire-bonded part is sealed with a sealing material 110. A terminal 42 of the flexible wiring substrate 40 located at an opposite position from the part connected to the printing element substrate 10 is electrically connected to a corresponding connection terminal 93 of the electric wiring substrate 90 (see FIGS. 3A and 4). Liquid communication ports 31 to be connected to the common supply passage 621 and the common collection passage 622 described with reference to FIG. 2 are formed in the support member 30 at positions corresponding to the communication ports 51 in the first passage submember 50. The support member 30 is a support for the printing element substrate 10 and is also a passage member located between the printing element substrate 10 and the passage member 210 at the same time. For this reason, the support member 30 is preferably a member having a high degree of flatness so as to be bonded to the printing element substrate 10 with high reliability. Examples of suitably usable materials therefor include alumina and a resin material.

Figure 9A:
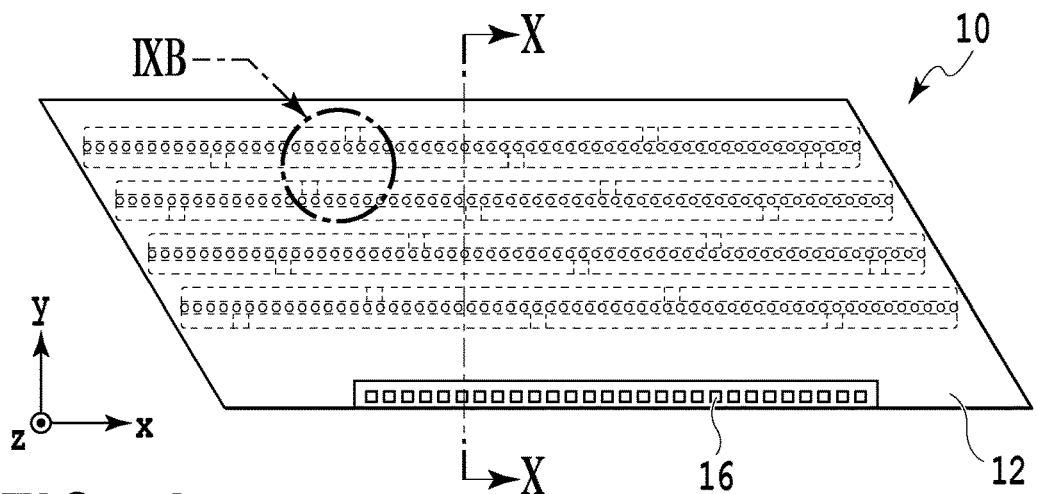
FIGS. 9A to 9C are diagrams for explaining a structure of a printing element substrate.
Figure 9B:
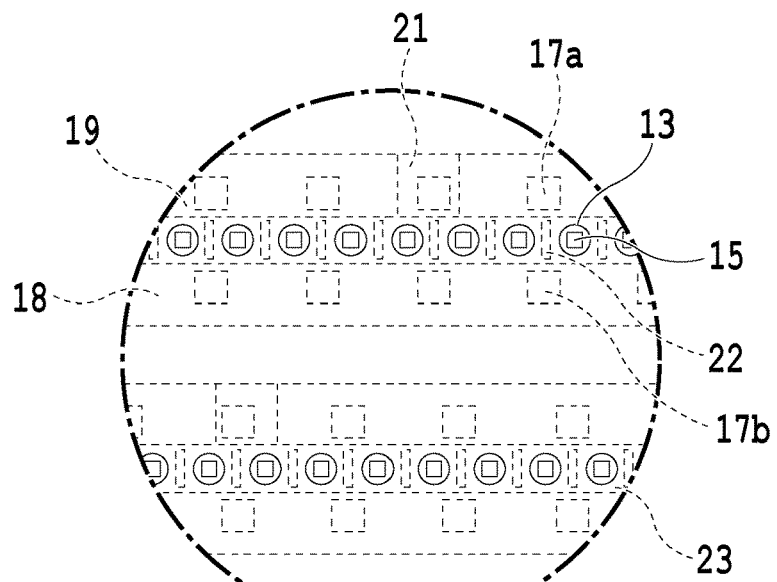
Figure 9C:
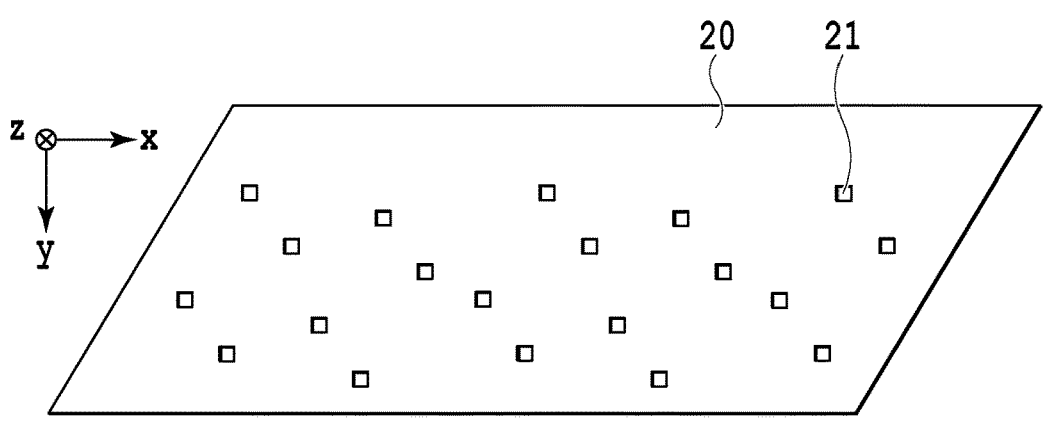
Figure 10:
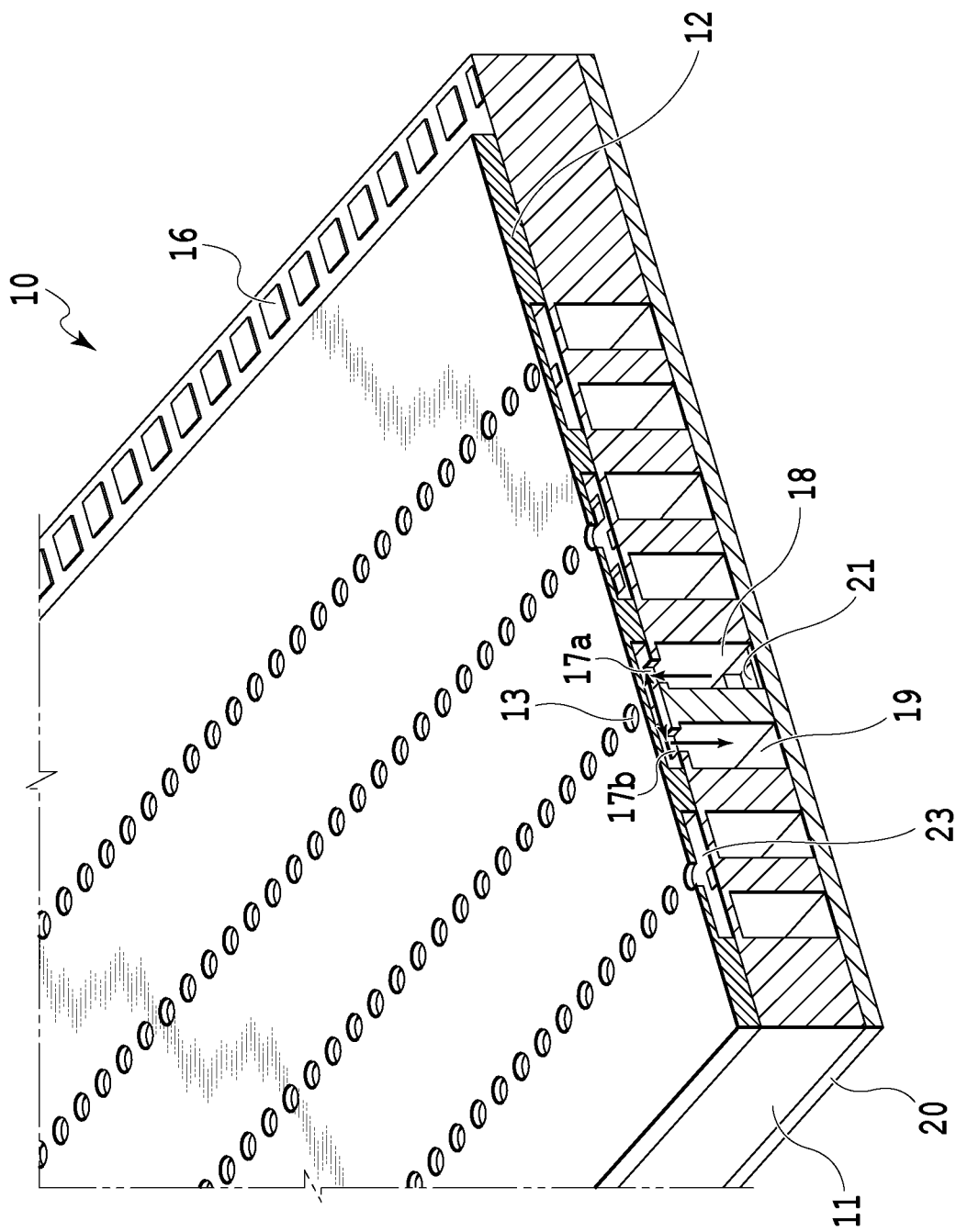
FIG. 10 is a diagram for explaining the structure of the printing element substrate.

FIGS. 9A to 9C and FIG. 10 are diagrams for explaining a structure of the printing element substrate 10. FIG. 9A is a top plan view of the printing element substrate 10, FIG. 9B is an enlarged view of a region IXB shown in FIG. 9A, and FIG. 9C is a rear view of the printing element substrate 10. Meanwhile, FIG. 10 is a cross-sectional view taken along the X-X line in FIG. 9A. As shown in FIG. 10, the printing element substrate 10 is formed mainly by stacking an ejecting port forming member 12, a substrate 11, and a lid member 20 on one another in the z direction.

As shown in the top plan view of FIG. 9A, in each ejecting port forming member 12 (the printing element substrate 10), ejecting port arrays each formed in such a way that ejecting ports 13 to eject the ink of the same color are arranged in the x direction are provided as many as the number of the ink colors and arranged in parallel in the y direction. Moreover, the terminal 16 to be bonded to the flexible wiring substrate 40 is formed at an end portion of the ejecting port forming member 12. The printing element substrate 10 of this embodiment takes on a parallelogram, and the ejecting module 200 is formed by arranging the fifteen printing element substrates 10 in the x direction.

FIG. 9B is the enlarged view of the region IXB shown in FIG. 9A. In the liquid ejecting head of this embodiment, each printing element (each nozzle) is formed from a thermoelectric conversion element 15, a pressure chamber 23, and an ejecting port 13. The pressure chamber 23 is formed from two partition walls 22 arranged in the x direction. The pressure chamber 23 incorporates an element (which is the thermoelectric conversion element 15 in this case) that generates energy used for ejecting the liquid. The thermoelectric conversion element 15 is electrically connected to the terminal 16, and its drive is controlled by a control circuit in the apparatus body through the electric wiring substrate 90 and the flexible wiring substrate 40. Based on the configuration described above, when a voltage pulse is applied to the thermoelectric conversion element 15 in accordance with the ejection data, film boiling occurs in the ink supplied to the pressure chamber 23, and growth energy of a bubble derived therefrom causes ejection of the ink from the ejecting port 13 located at a position opposite from the thermoelectric conversion element 15.

Meanwhile, a liquid supply passage 18 connected to the common supply passage 621 for supplying the ink to the pressure chambers 23 and a liquid collection passage 19 connected to the common collection passage 622 for collecting the ink from the pressure chambers 23 extend in the x direction on two sides in the y direction of each ejecting port array. Moreover, as also shown in the cross-sectional view of FIG. 10, supply ports 17a and collection ports 17b to communicate individually with the pressure chambers 23 are provided to the liquid supply passage 18 and the liquid collection passage 19, respectively. The liquid inside each pressure chamber 23 can circulate between the pressure chamber 23 and the outside through the supply port 17a and the collection port 17b.

Moreover, as also shown in FIG. 9C, the lid member 20 disposed to the side in contact with the first passage submember 50 is provided with multiple openings 21 at positions corresponding to the communication ports 51 in the first passage submember 50 so as to communicate with the liquid supply passages 18 and the liquid collection passages 19 in the printing element substrate 10, respectively. The above-described lid member 20 is required to have sufficient corrosion resistance against the liquids (the inks) and to satisfy high layout accuracy of the multiple openings 21 from the viewpoint of preventing color mixture. Therefore, it is preferable to provide the openings 21 by using a photosensitive resin material as well as a silicon plate and in accordance with a photolithographic process, for example.

According to the above-described configuration, in the ejecting module 200, the ink flows in the order of the opening 21, the liquid supply passage 18, the supply port 17a, the pressure chamber 23, the collection port 17b, the liquid collection passage 19, and the opening 21. Thereafter, when the thermoelectric conversion element 15 is driven while the ink flows in the pressure chamber 23, part of the ink is ejected from the ejecting port 13. In this case, the ink in the pressure chamber 23 stably flows irrespective of an ejection frequency. Accordingly, even if a thickened ink, bubbles, foreign matters, and the like are mixed therein, they are discharged (taken out) to the liquid collection passage 19 without remaining at particular positions.

Figure 11:
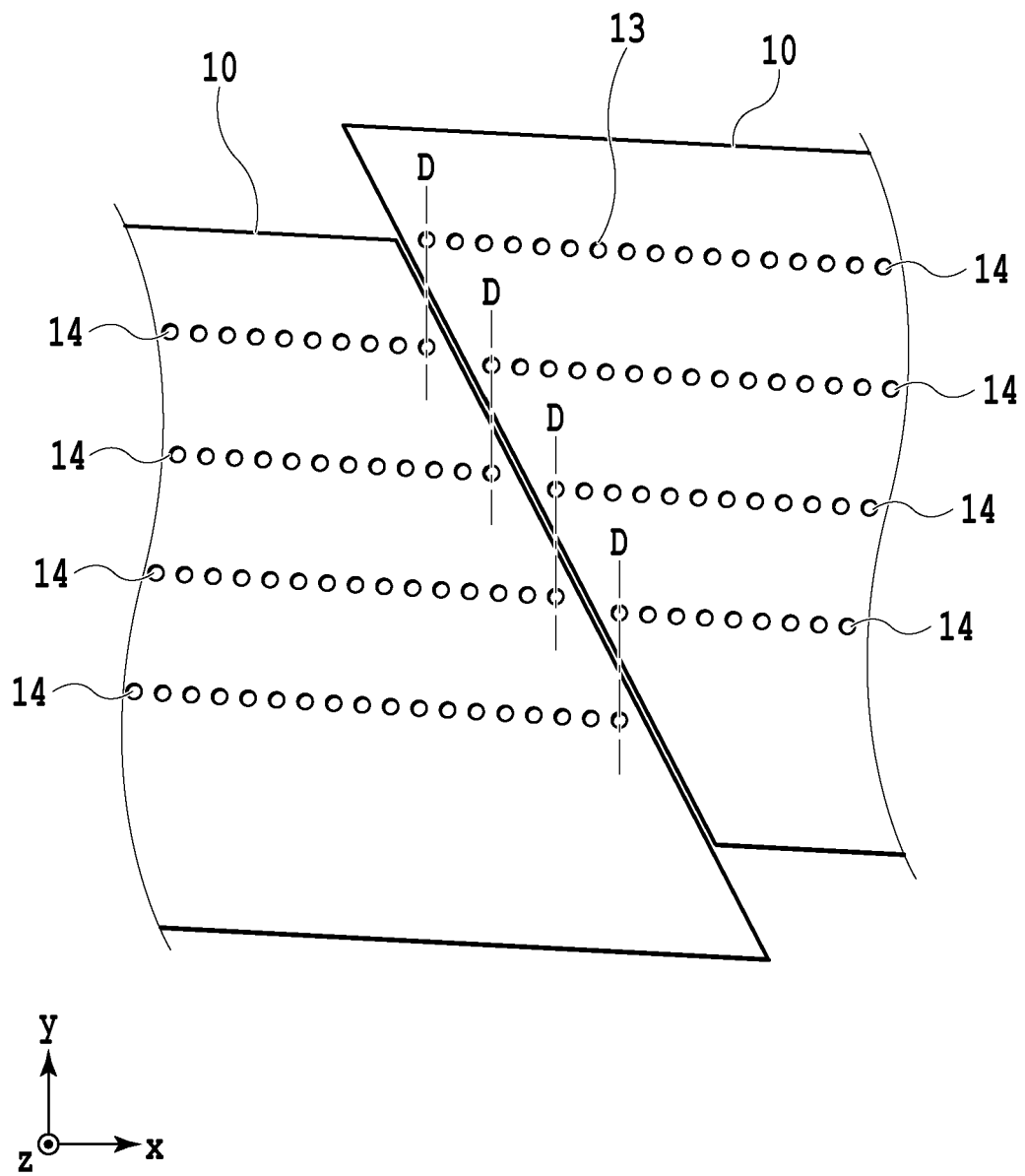
FIG. 11 is a diagram showing a state of connection of the printing element substrate.

FIG. 11 is a diagram showing a state of connection of the printing element substrate 10. As described with reference to FIG. 9A, each printing element substrate 10 of this embodiment takes on the parallelogram. Moreover, four ejecting port arrays 14 corresponding to the inks of four colors are formed by continuously arranging the multiple printing element substrates 10 in the x direction while bringing lateral sides of the adjacent printing element substrates 10 into contact with each other. Here, at connecting points of two printing element substrates 10, at least one ejecting port 13 located at a distal end portion of one of the printing element substrates 10 and an ejecting port 13 located at a distal end portion of the other printing element substrate 10 are laid out at the same position in the x direction. In other words, an oblique angle of the parallelogram is designed so as to achieve the aforementioned layout. In FIG. 11, a pair of ejecting ports 13 on a line D are laid out at the same position in the x direction.

According to the above-described configuration, even when two printing element substrates 10 are connected in a little misalignment in the course of manufacturing the liquid ejecting head, an image at a location corresponding to the connected part can be printed by cooperation of the multiple ejecting ports included in an overlapping region. Thus, it is possible to obscure streaks or voids in the image printed on a sheet, which are attributed to the misalignment. Although a principal flat surface of each printing element substrate 10 is formed into the parallelogram in this embodiment, the present invention is not limited only to this configuration. For example, it is also possible to use printing element substrates having a rectangular shape, a trapezoidal shape, and any other shapes.

(Molding Process for Passage Member)

Figure 12A:
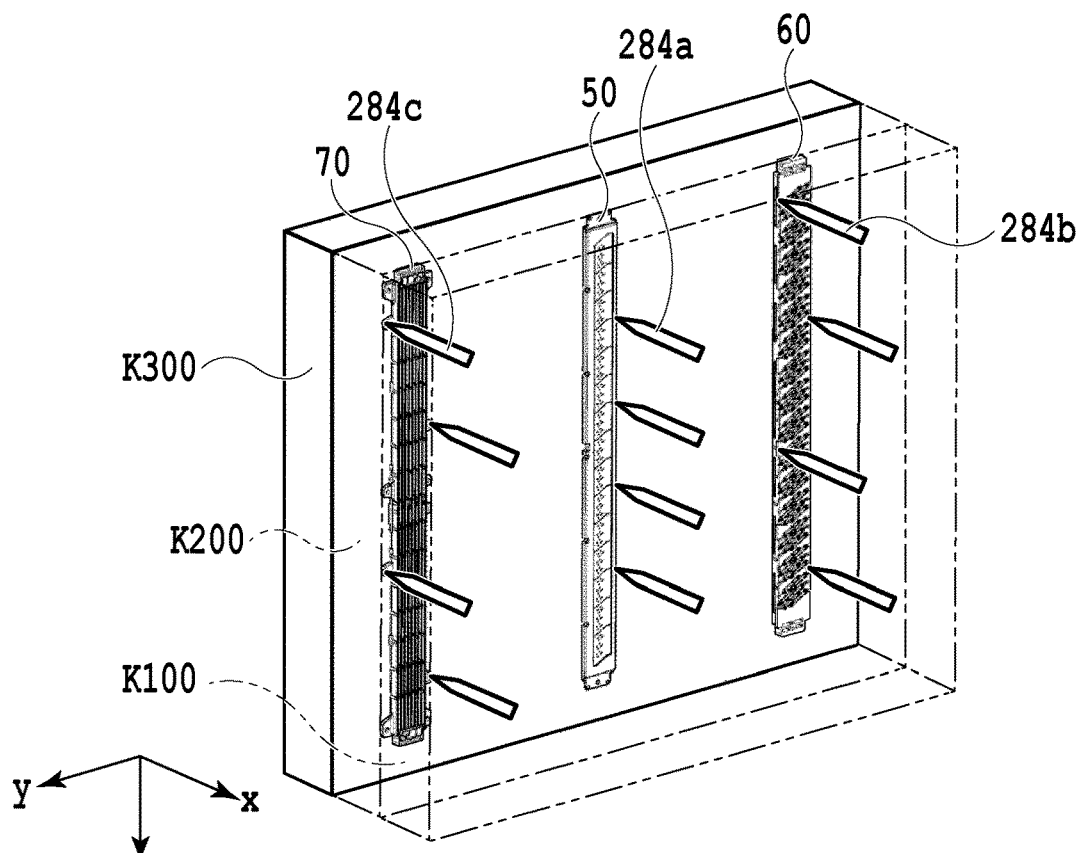
FIGS. 12A and 12B are diagrams showing a state of formation of a passage member in a mold assembly.
Figure 12B:
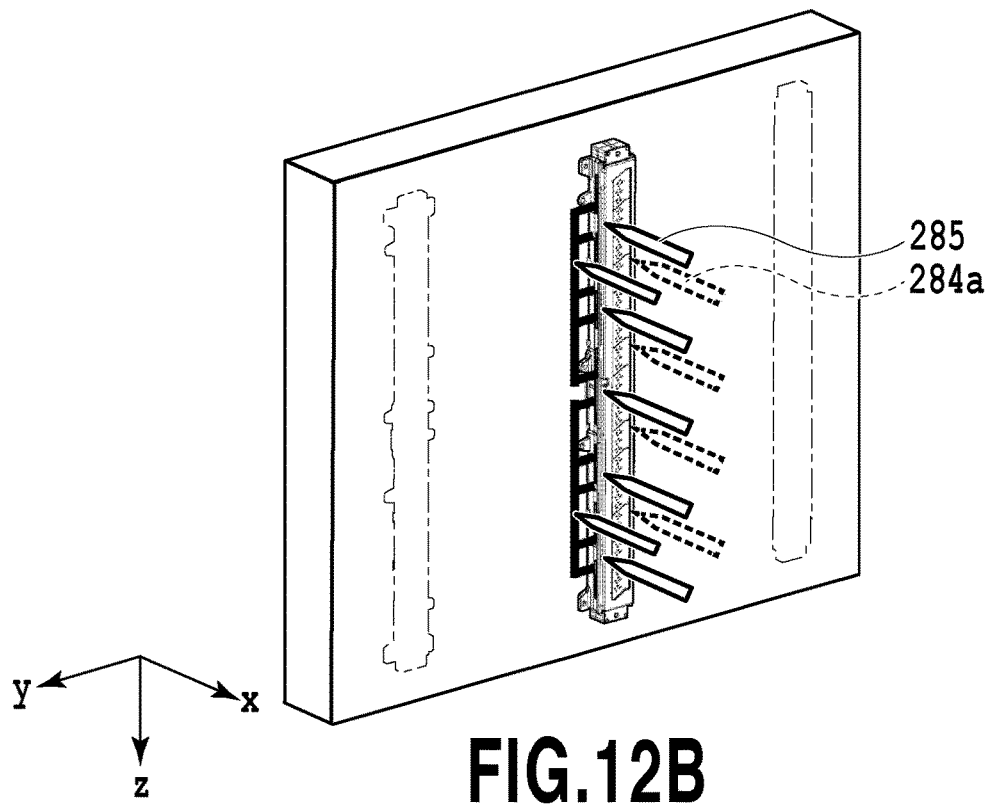

FIGS. 12A and 12B are diagrams for explaining formation positions and bonding positions inside the mold, which involve the first to third passage submembers (50, 60, and 70) in the passage member 210 of this embodiment. These three submembers are individually molded inside a mold assembly K001 and are also bonded to one another inside the mold assembly K001. In the following, a step of individual formation will be referred to as a first molding step and a step of bonding to one another will be referred to as a second molding step.

The mold assembly K001 of this embodiment is formed from three molds, namely, a fixed mold K100, an intermediate movable mold K200, and a movable mold K300, which have x-y planes and are detachable in the z direction and slidable in the y direction. The fixed mold K100 is provided with valve gates used for injecting a liquid resin into predetermined positions inside the molds.

In the first molding step, the first passage submember 50, the second passage submember 60, and the third passage submember 70 are molded at positions located away from one another in the y direction inside the mold assembly K001 by injecting a liquid resin from valve gates 284a to 284c shown in FIG. 12A. In the second molding step, the first passage submember 50, the second passage submember 60, and the third passage submember 70 are bonded to one another by injecting a liquid resin from valve gates 285 shown in FIG. 12B.

FIGS. 13A to 13D are cross-sectional views of the mold assembly K001 for explaining a manufacturing process for the passage member 210 in detail. The fixed mold K100, the intermediate movable mold K200, and the movable mold K300 are disposed along the z direction and in the order illustrated in FIG. 13A while rendering each corresponding pair of the x-y planes opposed to each other. The intermediate movable mold K200 and the movable mold K300 are movable in the –z direction relative to the fixed mold K100. As a consequence, these three molds are made capable of being attached to or detached from one another in the z direction.

Figure 13A:
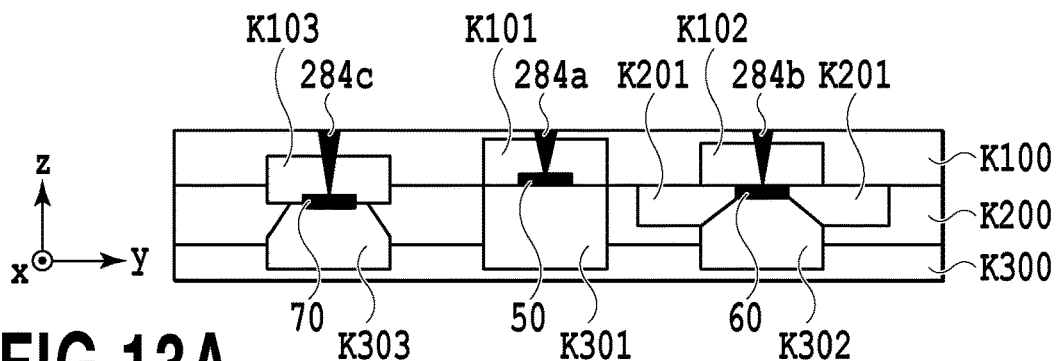
FIGS. 13A to 13D are diagrams for explaining a manufacturing process for the passage member.

FIG. 13A shows the state of the above-described three molds in the first molding step. In the first molding step, the three molds are bonded and clamped together in the z direction. In this state, the liquid resin is fed in from the valve gates 284a to 284c. In FIG. 13A, an insert mold for the first passage submember 50 is formed substantially at the center of the mold assembly K001 by using an insert mold piece K101 annexed to the fixed mold K100 and an insert mold piece K301 annexed to the movable mold K300. Hence, the first passage submember 50 is molded at this position by injecting the liquid resin from the valve gates 284a into this insert mold.

An insert mold for the second passage submember 60 is formed at a position shifted in the +y direction from the first passage submember 50 by using an insert mold piece K102 annexed to the fixed mold K100, an insert mold piece K201 annexed to the intermediate movable mold K200, and an insert mold piece K302 annexed to the movable mold K300. Hence, the second passage submember 60 is molded at this position by injecting the liquid resin from the valve gates 284b into this insert mold. Furthermore, an insert mold for the third passage submember 70 is formed at a position shifted in the –y direction from the first passage submember 50 by using an insert mold piece K103 annexed to the fixed mold K100 and an insert mold piece K303 annexed to the movable mold K300. Hence, the third passage submember 70 is molded by injecting the liquid resin from the valve gates 284c into this insert mold.

Figure 13B:
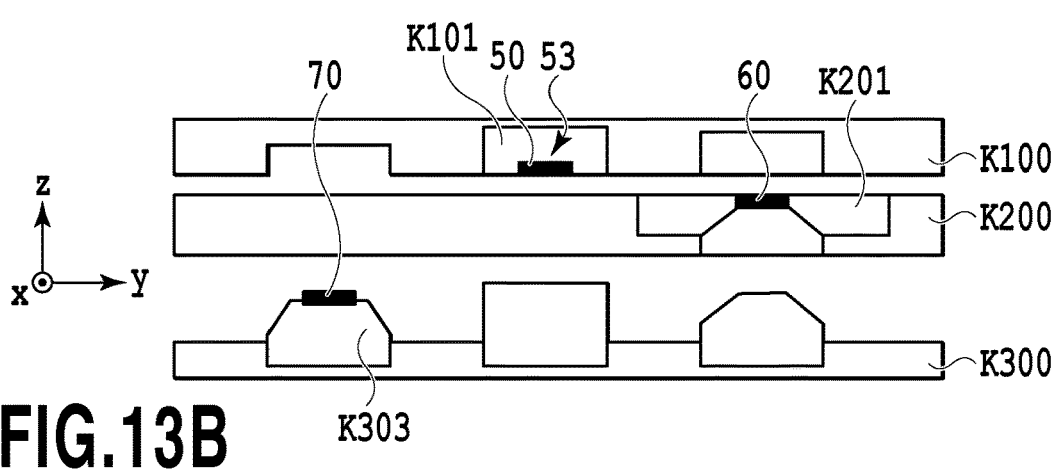

When the above-described first molding step is completed, the intermediate movable mold K200 and the movable mold K300 are moved in the –z direction, and the fixed mold K100, the intermediate movable mold K200, and the movable mold K300 are thus detached from one another in the z direction. FIG. 13B shows the state after the detachment takes place. At this stage, the first passage submember 50 is held by the insert mold piece K101 of the fixed mold K100, the second passage submember 60 is held by the insert mold piece K201 of the intermediate movable mold K200, and the third passage submember 70 is held by the insert mold piece K303 of the movable mold K300, respectively.

Figure 13C:
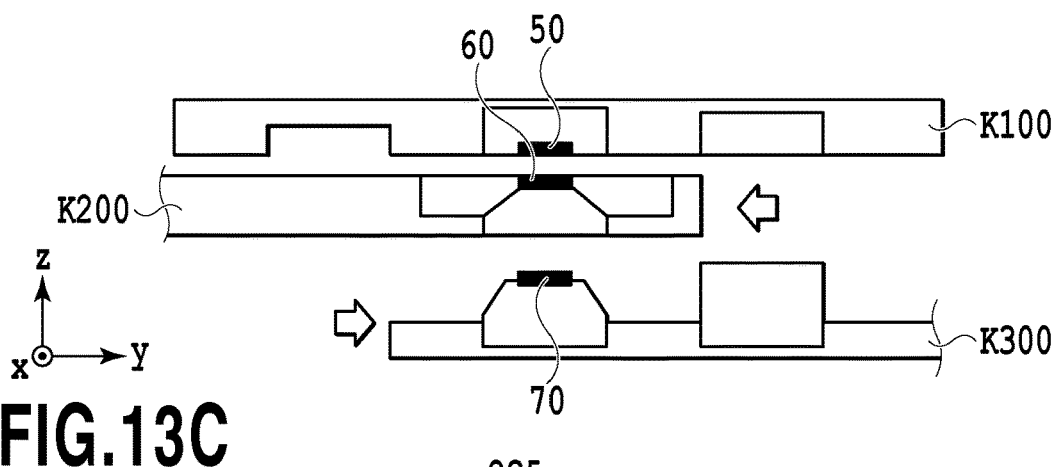

When the above-described detaching step is completed, the intermediate movable mold K200 is moved in the –y direction while the movable mold K300 is moved in the +y direction so as to perform positioning among the first passage submember 50, the second passage submember 60, and the third passage submember 70 in the y direction. FIG. 13C shows the state after completion of the above-mentioned positioning. The first passage submember 50, the second passage submember 60, and the third passage submember 70 formed in the first molding step are laid out at the same position in the y direction.

Figure 13D:
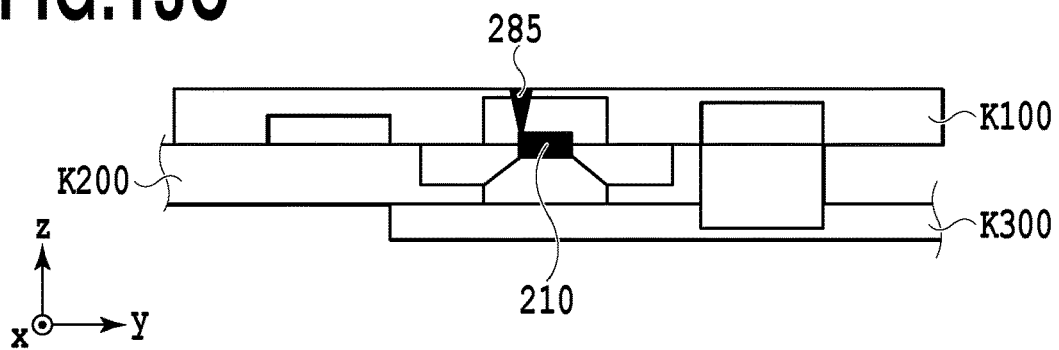

When the above-described positioning is completed, the intermediate movable mold K200 and the movable mold K300 are moved in the +z direction, whereby the fixed mold K100, the intermediate movable mold K200, and the movable mold K300 are clamped together again. FIG. 13D shows the state after the mold clamping is competed and the second molding step is about to be executed. By clamping the molds, the first passage submember 50, the second passage submember 60, and the third passage submember 70 come into contact with one another in the z direction, and resin passages used for bonding these passage submembers to one another are formed at part of the portions in contact. Then, the first passage submember 50, the second passage submember 60, and the third passage submember 70 are bonded to one another by injecting a liquid resin from the valve gates 285 into the resin passages, and the passage member 210 of this embodiment is thus finished.

Figure 14:
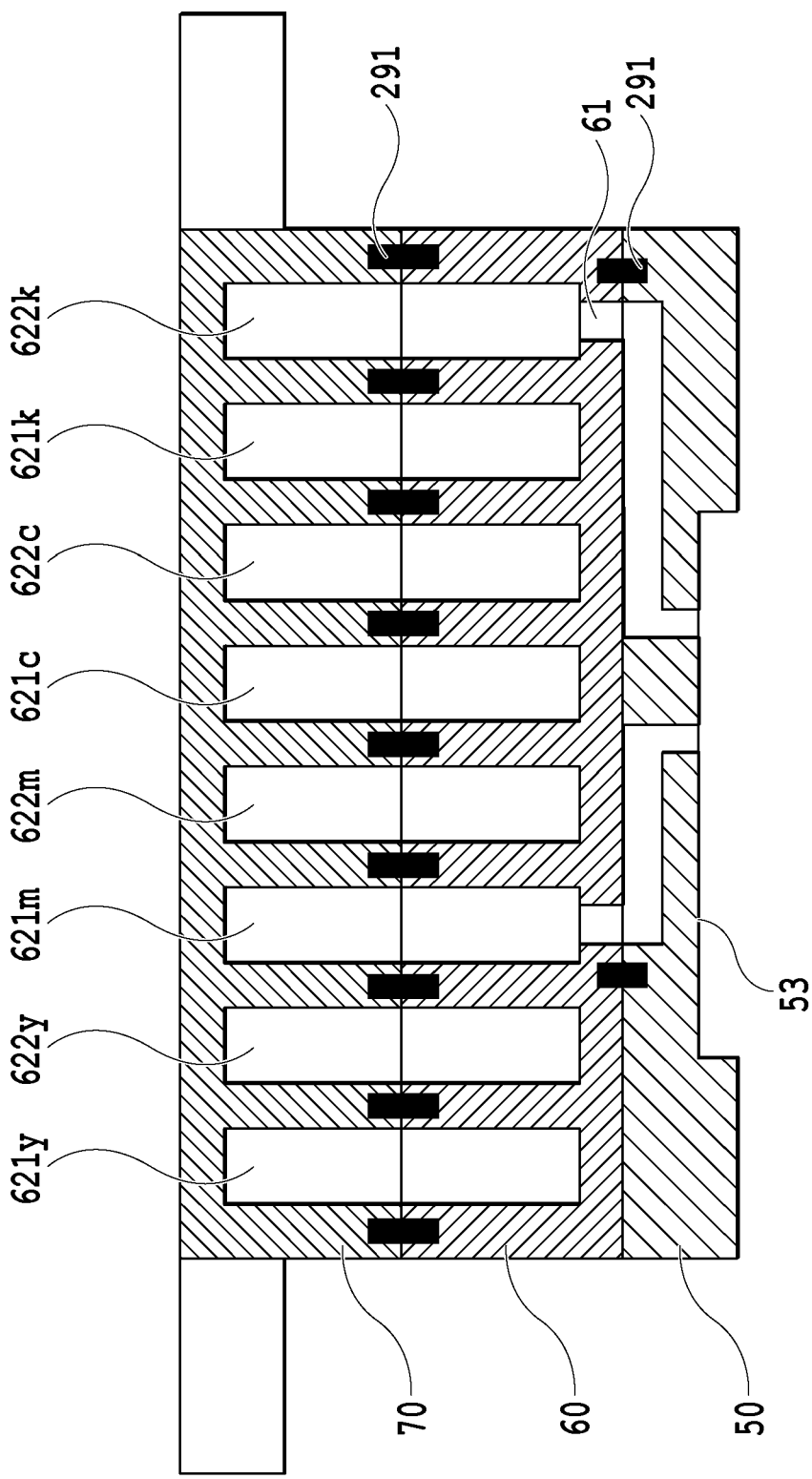
FIG. 14 is a diagram showing bonding points of the passage member in a second molding step.

FIG. 14 is a diagram showing positions of the resin passages in the second molding step, that is, bonding points 291 of the first passage submember 50, the second passage submember 60, and the third passage submember 70. The first passage submember 50 and the second passage submember 60 are joined to each other at positions around the individual supply passages and the individual collection passages (some of them are not illustrated) so as to ensure these passages. In the meantime, the second passage submember 60 and the third passage submember 70 are joined to each other at positions around the respective common supply passages and the respective common collection passages so as to ensure these common passages.

After the passage member 210 is finished by the above-described steps, multiple ejecting modules 200 are attached to a bonding surface 53 of the first passage submember 50 by use of an adhesive. Moreover, the cover member 130 is attached so as to entirely cover these constituents, and the liquid ejecting unit 300 of this embodiment is thus finished.

Generally, in the case of the resin molding by using a thermoreversible resin, a certain level of warpage or undulation occurs due to shrinkage of the resin at the stage of taking the molded resin components off the mold assembly and cooling the components. Moreover, bonding the components containing such warpage or undulation together may further lead to deformation of a finished product. However, the deformation can be suppressed by adopting the configuration of this embodiment, in which the respective passage submembers are held inside the mold assembly and by the inserts used for molding the respective passage submembers during a period from the first molding step of molding the respective passage submembers to completion of the second molding step of bonding the passage submembers to one another. In particular, the bonding surface 53 of the first passage submember 50 serving as an attachment point to the ejecting modules 200 is held by the insert mold piece K101 of the fixed mold K100 until the completion of the second molding step, and the deformation due to air cooling after the detachment is sufficiently suppressed. As a consequence, the adhesion to the ejecting modules 200 is also ensured. Thus, it is possible to realize the highly reliable passage member 210 and to improve printing accuracy on a printing medium.

Other Embodiments

Although the above-described embodiment has the configuration in which the three components molded in the first molding step are bonded to one another in a lump by locating the components at the same position in the y direction. Instead, these three components may also be bonded stepwise. For example, after the first molding step, the third passage submember 70 and the second passage submember 60 may first be subjected to positioning and then bonded to each other. Thereafter, a bonded aggregate of the third passage submember 70 and the second passage submember 60 may further be subjected to positioning with respect to the first passage submember 50, and then these components may be bonded together. In this configuration as well, the first passage submember 50, the second passage submember 60, and the third passage submember 70 are held by the mold assembly K001 until the bonding of all these submembers is completed. Accordingly, it is possible to achieve the effect of the present invention, which is to suppress the deformation due to warpage or undulation.

In the meantime, the description has been made above based on the example of the inkjet printing head of a thermal mode that employs thermoelectric conversion elements. However, the mode of liquid ejection is not limited only to the foregoing. The present invention is also applicable to other liquid ejecting modes such as a piezoelectric mode. Moreover, the description has been made above based on the example of the full-line type inkjet printing apparatus including the liquid circulation passages by using FIG. 2. However, the present invention is not limited only to this configuration. For instance, an ink may flow from an ink tank located upstream of a liquid ejecting head to another ink tank located downstream thereof. Thus, the liquid does not always have to be circulated. Furthermore, the ink tank may be configured to supply just an amount of an ink to be ejected from a liquid ejecting head in accordance with printing data. In the meantime, the liquid ejecting head does not always have to be of the full-line type. Even in the case of a liquid ejecting head of a serial type, for instance, a relatively elongated head involves passage members for supplying liquids to the head, which emphasize flatness and adhesion to a printing element substrate. Accordingly, the manufacturing method of the present invention is also effective in this configuration.

In any case, the present invention can effectively function in any passage member for directly supplying a liquid to a liquid ejecting module, in which the passage member is designed to be manufactured by stacking multiple flat plate-shaped passage submembers that are molded by resin molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228054, filed Nov. 24, 2016 which is hereby incorporated by reference wherein in its entirety.

What is claimed is:

1. A method of manufacturing a liquid ejecting head having
   a liquid ejecting module provided with arrayed elements to eject a liquid, and
   a passage member to supply the liquid to the liquid ejecting module,
   the method comprising:
   a first molding step of molding a first member, a second member, and a third member, which collectively form the passage member, at different locations inside of a set of a fixed mold, an intermediate movable mold, and a movable mold being made detachable from one another in a first direction, the set being clamped together in the first direction, by injecting a resin to the different locations inside;
   a step of performing positioning among the first member, the second member, and the third member in a second direction different from the first direction after the first molding step, by moving the intermediate movable mold and the movable mold in the first direction to detach the fixed mold, the intermediate movable mold, and the movable mold from one another, and moving the intermediate movable mold and the movable mold in the second direction; and
   a second molding step after the step of performing the positioning, by injecting a resin to the inside of the set of the fixed mold, the intermediate movable mold, and the movable mold being clamped together in the first direction so as to bond the first member, the second member, and the third member to one another, wherein
   during a period from the first molding step to completion of the second molding step, the first member, the second member, and the third member are held by insert mold pieces used for molding the members, respectively, in the first molding step.

2. The method of manufacturing a liquid ejecting head according to claim 1, further comprising:
   a step of taking off the passage member from the mold assembly after the second molding step, and bonding a bonding surface provided to the first member to the liquid ejecting module, wherein
   the bonding surface is held by an insert mold annexed to the fixed mold during the period from the first molding step to completion of the second molding step.

3. The method of manufacturing a liquid ejecting head according to claim 1, wherein the passage member supplies the liquid to a plurality of the liquid ejecting modules concurrently.

4. The method of manufacturing a liquid ejecting head according to claim 1, wherein the first member, the second member, and the third member have a flat plate shape extending vertically to the first direction.

5. The method of manufacturing a liquid ejecting head according to claim 1, wherein the first member, the second member, and the third member are stacked in this order in the first direction.

6. The method of manufacturing a liquid ejecting head according to claim 1, wherein on joining surfaces between the second member and the third member, a passage extending along the longitudinal direction of the passage member is provided.

7. The method of manufacturing a liquid ejecting head according to claim 2, wherein a plurality of the liquid ejecting modules are bonded on the bonding surface of the first member extending along the longitudinal direction of the passage member.

8. The method of manufacturing a liquid ejecting head according to claim 7, wherein the plurality of the liquid ejecting modules are bonded in a straight line on the bonding surface.

9. The method of manufacturing a liquid ejecting head according to claim 1, wherein the liquid ejecting head is a full-line type inkjet printing head.

10. The method of manufacturing a liquid ejecting head according to claim 1, wherein the liquid ejecting head is a color inkjet printing head capable of ejecting inks of a plurality of colors, and a passage for each of the plurality of colors is formed in the passage member.

11. The method of manufacturing a liquid ejecting head according to claim 1, wherein a passage for an ink to be supplied to the liquid ejecting module and a passage for the ink to be collected from the liquid ejecting module are formed in the passage member.

* * * * *